United States Patent
Savage (10) Patent No.: US 7,701,083 B2
(45) Date of Patent: Apr. 20, 2010

(54) PORTABLE HYBRID APPLICATIONS FOR AC/DC LOAD SHARING

(75) Inventor: Paul Savage, Cold Spring, NY (US)

(73) Assignee: Nextek Power Systems, Inc., Hauppauge, NY (US)

( * ) Notice: Subject to any disclaimer, the term of this patent is extended or adjusted under 35 U.S.C. 154(b) by 745 days.

(21) Appl. No.: 11/260,413

(22) Filed: Oct. 27, 2005

(65) Prior Publication Data

US 2006/0087800 A1  Apr. 27, 2006

Related U.S. Application Data

(60) Provisional application No. 60/622,579, filed on Oct. 27, 2004.

(51) Int. Cl.
 *H02J 1/10* (2006.01)
(52) U.S. Cl. .......................................... 307/29; 307/26
(58) Field of Classification Search .................. 52/36.1; 235/375; 361/810; 429/17; 174/505, 541; 307/22, 26, 29, 147; 439/214, 215, 216
See application file for complete search history.

(56) References Cited

U.S. PATENT DOCUMENTS

| | | | | |
|---|---|---|---|---|
| 5,160,851 A | * | 11/1992 | McAndrews | ................. 307/66 |
| 5,510,691 A | * | 4/1996 | Palatov | ....................... 320/111 |
| 5,715,156 A | | 2/1998 | Yilmaz et al. | |
| 6,153,946 A | * | 11/2000 | Koch et al. | ..................... 307/64 |
| 6,560,131 B1 | * | 5/2003 | vonBrethorst | ............... 363/146 |
| 6,614,130 B2 | * | 9/2003 | Wilhelm | ...................... 307/11 |
| 6,937,490 B2 | | 8/2005 | MacDonald et al. | |
| 7,449,798 B2 | * | 11/2008 | Suzuki et al. | .................. 307/65 |
| 2003/0085624 A1 | * | 5/2003 | Kadoi et al. | .................. 307/64 |
| 2003/0160514 A1 | * | 8/2003 | Rajagopalan | ................ 307/65 |
| 2004/0026998 A1 | * | 2/2004 | Henriott et al. | ............. 307/9.1 |
| 2004/0027839 A1 | | 2/2004 | Deng et al. | |
| 2004/0070319 A1 | * | 4/2004 | Miller | ...................... 312/208.1 |
| 2005/0141154 A1 | * | 6/2005 | Consadori et al. | ............. 361/62 |
| 2006/0076830 A1 | * | 4/2006 | Hair et al. | ....................... 307/1 |
| 2006/0121321 A1 | * | 6/2006 | Laukhuf | ...................... 429/12 |

* cited by examiner

*Primary Examiner*—Albert W Paladini
*Assistant Examiner*—Daniel Cavallari
(74) *Attorney, Agent, or Firm*—Kirschstein, et al.

(57) ABSTRACT

Portable hybrid applications for AC/DC load sharing includes circuitry for simultaneously using at least one of external AC, internal DC power and/or external DC power. The apparatus also includes an input power receptacle for receiving at least one of AC power and external DC power. A power router inside the apparatus routes at least one of AC power, internal DC power, and external DC power to provide power for an application. An apparatus for providing DC to DC conversion includes a tip and a DC to DC whip connected to the tip. A male plug is connected to the second end of the whip. A buck converter within the male plug converts DC power to a DC power level associated with the whip and transmits the converted DC power along the DC to DC whip to the tip. Alternatively, an internal DC source provides internal DC power.

9 Claims, 11 Drawing Sheets

PORTABLE HYBRID APPLICATIONS FOR AC/DC LOAD SHARING

CROSS-REFERENCE TO RELATED APPLICATIONS

This application claims benefit of U.S. Provisional patent application Ser. No. 60/622,579, filed Oct. 27, 2004, which is herein incorporated by reference.

BACKGROUND OF THE INVENTION

1. Field of the Invention

Embodiments of the present invention generally relate to applications of portable AC/DC power sharing. In particular, the present invention relates to methods and apparatuses for incorporating and using AC/DC power sharing in portable devices/products, such as being provided and embedded in laptop computers, handheld electronic devices, camping, recreational and marine products, or as provided and embedded in an appliance, such as personal desktop computers, work space desks and cubicles, microwave ovens, dehumidifiers, exterior landscape lighting or interior lighting, etc. For example, the present invention may relate to a DC hybrid environment which permits DC sources of renewable energy to be plugged into a home office, allowing for the DC distributed generation resource to be used in preference to AC grid-supplied power, in concert with back-up power as in a UPS.

2. Description of the Related Art

Office modules and office cubicles are most commonly used in conjunction with computer and other electronic equipment. Both communications and power lines are required to operate such equipment. Although the equipment itself is intrinsically DC, only AC power inputs are supplied to these modules.

The prior art illustrates some efforts to pre-wire these office modules for distribution of AC power and communications lines.

For example, U.S. Pat. No. 5,595,495 of Johnson speaks to low voltage control of AC power in office partitions and wall systems.

Additionally, a control system for office equipment is described in U.S. Pat. No. 5,289,365 of Caldwell et al.

Furthermore, U.S. Pat. No. 5,164,609 of Poppe describes a controllable power distribution system capable of supplying switched power to an individual work station or to an entire office.

Additionally, Mobility Electronics, Inc. of Scottsdale Ariz. provides buck converters with programmable voltage cord sets.

Moreover, U.S. Pat. Nos. 5,786,642, 6,252,310 and 6,614,130 of Wilhelm describe modular power management systems sharing AC and multiple DC power sources to power DC compatible loads. Other features of these patents describe the combined distribution of AC and low voltage DC and their common availability at an ordinary duplex AC outlet. With the incorporation of a storage battery, these modular power management systems also provide the advantages of an uninterruptible power supply ("UPS").

OBJECTS OF THE INVENTION

It is an object of the present invention to provide portable hybrid applications for AC/DC load sharing.

It is also an object of the present invention to provide distributed generation resource to be used with a portable DC applications, such as, for example, a hybrid office module in preference to AC grid-supplied power, which acts in concert with back-up power as in a UPS.

It is yet an alternate object of the present invention to provide an office environment such as workers' cubicles in an office building, where work stations can be outfitted with the same power interface that is plugged into both regular AC outlets available to them, as well as to be plugged into the building fascia equipped with renewable energy resources, such as solar or wind collectors.

It is further an alternate object of the present invention to provide a DC hybrid office module which can optionally be configured in a network of similar modules in a larger office sharing a variety of DC power sources through a central controller.

It is also an object of the present invention to improve over the disadvantages of the prior art.

Other objects which become apparent from the following description of the present invention.

SUMMARY OF THE INVENTION

The present invention generally relates to hybrid AC/DC load sharing in portable applications/devices and DC to DC conversion. In one embodiment, the invention is applicable as a DC to DC power cord. This embodiment includes a tip and a DC to DC whip having a first end and a second end, where the first end is connected to the tip. This embodiment also includes a male plug connected to the second end of the whip. An integrated buck converter is within the male plug and converts DC power to a DC power level associated with the tip and transmits said converted DC power along said DC to DC whip power to the tip.

The present invention relates to methods and apparatuses for incorporating and using AC/DC power sharing in portable devices/products, such as being provided and embedded in laptop computers, handheld electronic devices, camping, recreational and marine products, or as provided and embedded in an appliance, such as personal desktop computers, work space desks and cubicles, microwave ovens, dehumidifiers, exterior landscape lighting or interior lighting, etc. For example, the present invention may relate to a DC hybrid environment which permits DC sources of renewable energy to be plugged into a home office, allowing for the DC distributed generation resource to be used in preference to AC grid-supplied power, in concert with back-up power as in a UPS.

In another embodiment, the invention includes an internal DC source for providing internal DC power. There is also circuitry for simultaneously using at least one of external AC, the external DC power, external DC power. The apparatus also includes an input power receptacle for receiving at least one of the AC power and the external DC power. A power router inside the apparatus routes at least one of the AC power, the internal DC power, and the external DC power to provide power for an application of said apparatus.

An example of one embodiment of the present invention is a DC hybrid office module, which is a pre-wired work station, which permits sources of renewable energy to be plugged into a home office, allowing for the distributed generation resource to be used in preference to grid-supplied power in concert with back-up power as in a universal power supply (UPS).

Likewise, in an office environment such as workers' cubicles in an office building, these work stations can be outfitted with the same power interface that is plugged into both regular AC outlets available to them, as well as to be plugged into the building fascia equipped with solar or wind collectors.

In an alternate embodiment, a similar office module can be configured in a network of similar modules in a larger office sharing a variety of DC power sources through a central controller.

The DC hybrid office module preferably includes one or more of the following features:

a) a power interface for renewable energy sources to plug into without further customer intervention;
b) managed battery storage that can be added to, or be reconfigured by the user;
c) standard 3-wire outlets that can duplex AC and DC power for either type of load;
d) integrated light emitting diode (LED) task lighting;
e) integrated intelligence that logs and reports renewable energy usage, AC usage, battery capacity, and the state of the storage medium; and/or,
f) integrated intelligence that can communicate and coordinate with adjacent units to dynamically share resources.

A typical example of the DC hybrid office module includes a workstation with a desk pre-wired for AC and DC power distribution, an input power receptacle for receiving AC and DC power input, a power router for receiving AC and DC power from the input power receptacle to provide DC outputs to DC loads of said workstation and AC outputs for AC loads of said workstation through a duplex AC/DC power outlet, and an interactive display for providing input to said module and displaying use of said AC and DC power. The power router preferably has a microprocessor control unit controlling a voltage regulator.

The power router includes a ganged AC/DC circuit breaker with reset switch for tripping in the event of an AC short circuit or a malfunction in DC power input or overload in either AC or DC loads for isolating the office module. Preferably, the AC input includes a neutral line having DC blocked by a blocking capacitor which is of sufficient size as to allow low loss passage of unbalanced AC in a typical 3-wire supply system.

The DC power input may include one or more batteries, one or more fuel cells, or a renewable power source, such as one or more solar panels or wind turbines. The interactive display may be a touch screen or a keyboard responsive screen for providing control input to the office module and displaying use of the AC and DC power. The interactive display reports renewable energy and AC usage, as well as the state of charge of battery.

The voltage regulator preferably outputs constant DC voltage through a blocking diode to DC loads of the office module.

A battery may be provided as a source of DC power and a battery charger may be controlled by the microprocessor control unit. A filter capacitor across the battery preferably provides sufficiently low impedance to trip the ganged circuit breaker in the event of an AC short circuit or malfunction while the battery is disconnected. A DC portion of the ganged AC/DC circuit breaker is wired in series with a negative leg of a DC output line to a neutral connector of the duplex AC/DC power outlet.

A switch assembly under network control preferably selects input or output direction of DC where there is sharing of resources with another module.

In a multi-module option, a controller dynamically shares multiple DC inputs and/or battery stored power among multiple modules.

Optionally, the office module of includes integrated LED's or DC ballasted fluorescent lamps for lighting.

In the preferred embodiment of the a portable DC application, such as, for example, a DC hybrid office module or other work station, an AC/DC converter module is included as an integral part of the power router module. Also included is a meter control module which measures voltages and currents in various portions of the DC power network works in conjunction with microprocessor controls to maximize power transfer from remote DC power sources such as PV panels or even human generated power sources such as exercise bikes or other exercise equipment.

Also included in the preferred embodiment is an enhanced DC power extension cord (or DC whip) which plugs into an outlet that provides a standard low voltage DC (such as 24 or 48 volts). The standard appearing three-prong plug actually has a built-in DC/DC converter within which adjusts the voltage at the output connector at the end of the extension cord as required. The adjustment is determined by a device within the replaceable connector tip itself or by a device within the load which communicates with the tip. This device can be as simple as a resistor whose value is interrogated by the DC/DC converter within the plug to adjust the output voltage accordingly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

For illustrative purposes only, the invention is described with respect to a workstation; however, that depiction is not intended in any way to limit the scope of the invention. For example, the invention may be used with other portable devices (i.e., movable; having the ability to be used by an end-user into an existing AC power grid; and not requiring the installation of additional equipment). In addition, the invention also provides for DC to DC conversion for use with various portable devices/applications (e.g., a laptop computer).

Figure 1:
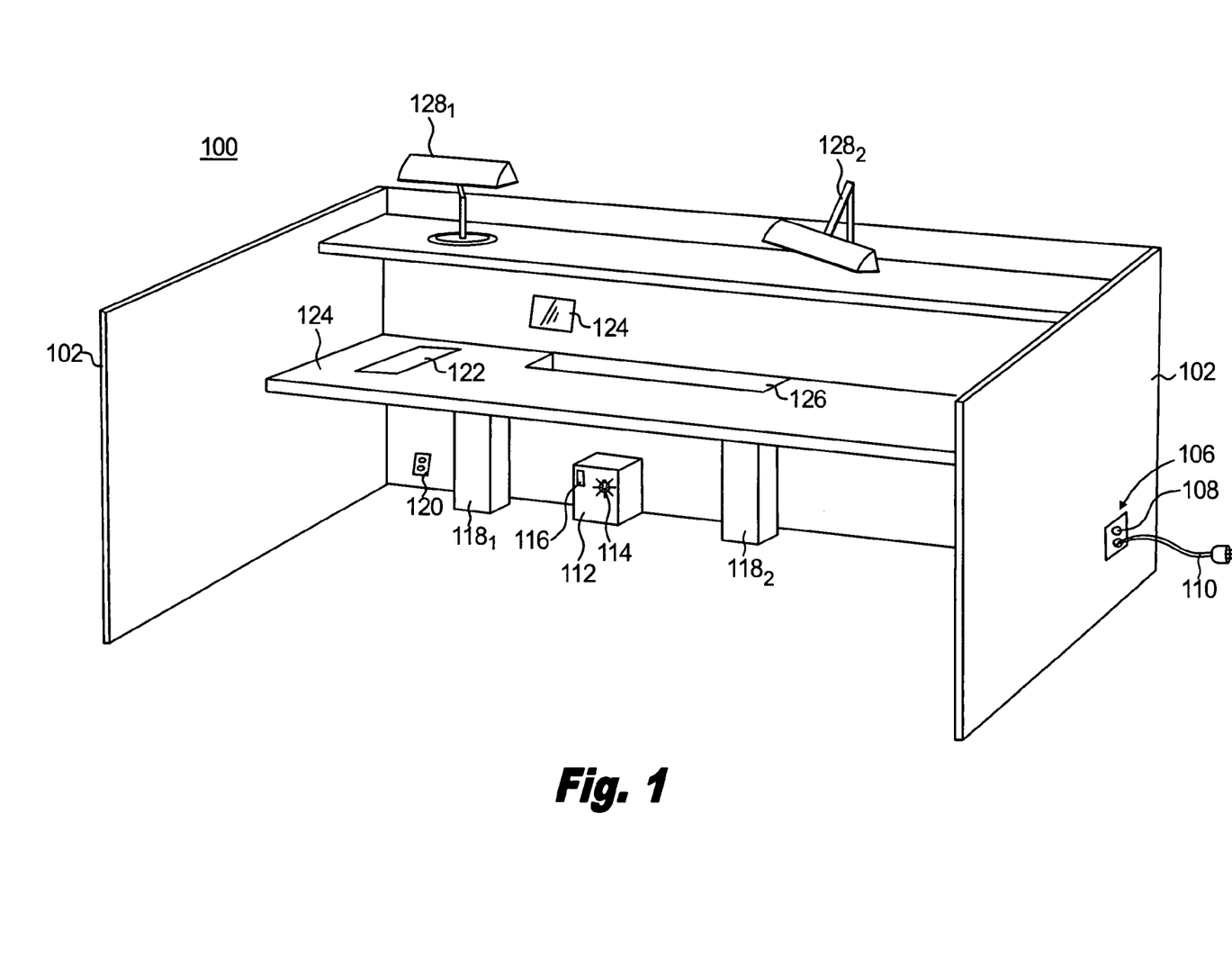
FIG. 1 is a perspective view of an embodiment of a portable apparatus used in accordance with one aspect of the invention.

FIG. 1 is a perspective view of an embodiment of an apparatus used in accordance with one aspect of the invention. Specifically, FIG. 1 shows an AC/DC hybrid workstation 100. The workstation 100 includes a work-surface 104 supported by three sides 102. The workstation 100 also includes an input receptacle 106; an AC/DC power supply (a.k.a. a power supply) 112; battery compartments $118_1$ and $118_2$; and a power outlet 120.

The input receptacle 106 includes a DC input connector 108 and an AC power cord 110. The input receptacle is capable of receiving DC power, via the DC input connector 108, from an outside source and AC power, via the AC power cord 110, from an AC power grid. As described in further detail below, Mounted on the work-surface 104 are task lights $128_1$ and $128_2$; a monitoring and control display 122; an alternative control display location 124; and a trough 126. The trough 126 is optional and serves as a storage compartment (e.g., for storing items such as DC connectors for DC power modules for cell phones, personal digital assistants (PDA's), and DC "whips" (described in greater detail below), etc.).

Monitoring and control display 122 is an interface which allows user input and display. For example, monitoring and control display 122 can be a monitor and keyboard; a touch screen for user input of data, set points and information; a desktop computer; and/or a laptop computer. In addition, the monitoring and control display 122 display critical factors, such as for example but not limited to, renewable energy use, AC usage, battery capacity, and state of storage medium. The alternative control display location 124 is also optional.

Illustratively, the task lights $128_1$ and $128_2$ are DC powered using LED's or DC ballasted fluorescent lamps. However, task lights $128_1$ and $128_2$ are AC powered in other embodiments. In addition, task lights $128_1$ and $128_2$ may be adjustable (as shown) or more integrated with workstation 100.

FIG. 1 also shows an AC/DC power supply 112 includes a power on indicator light 114; and a ganged AC/DC circuit breaker reset switch 116. The AC/DC power supply 112 is described in greater detail below in the description of FIG. 3.

The power outlet 120 is depicted as a single duplex AC/DC power outlet 112. The power outlet 120 is capable of allocating and transmitting either AC or DC from the AC/DC power supply 112. As described in greater detail below, typical electrical wiring provides for a line phase, a neutral phase, and a ground phase. AC power is supplied using the line and the ground wires; and DC power is transmitted using ground and neutral wires. In the instance when DC power is transmitted from the power outlet 120 to a device using DC a typical AC to DC buck converter (i.e., a converter containing a transformer and rectifier) is not needed. A DC to DC step down converter can be used and is described in greater detail below with respect to FIG. 7.

Figure 2:
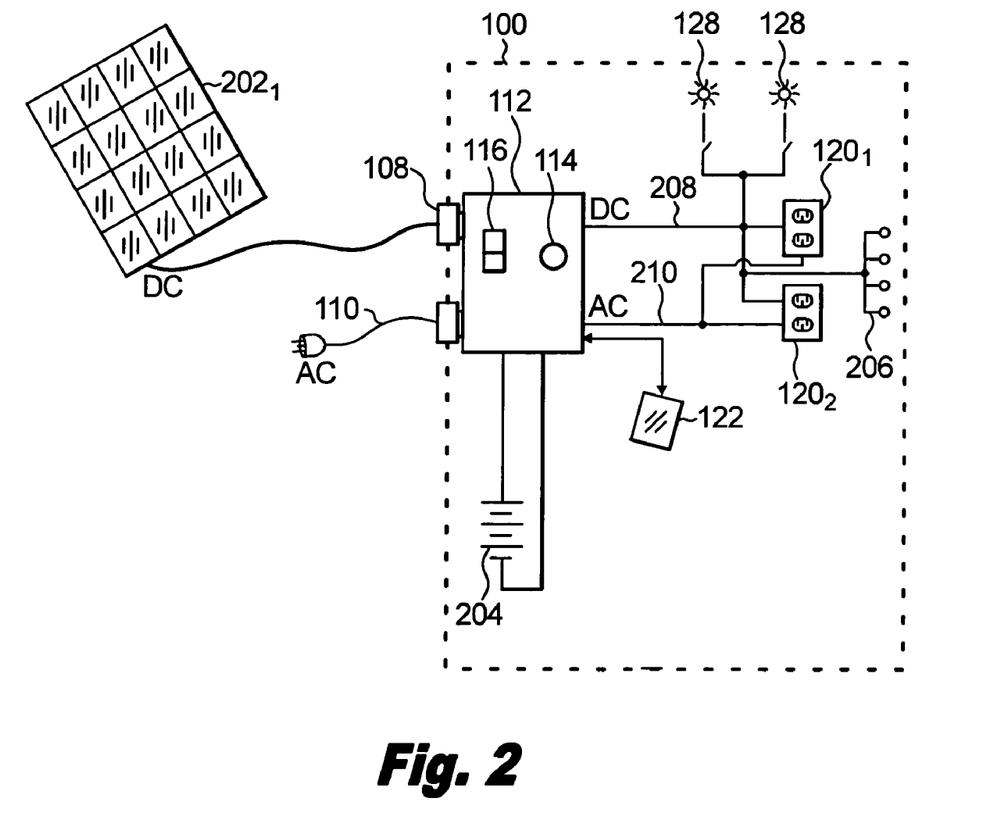
FIG. 2 is of an embodiment of a schematic diagram applicable to the embodiment described in FIG. 1.

FIG. 2 is of an embodiment of a schematic diagram applicable to the embodiment described in FIG. 1. Specifically, FIG. 2 shows a wiring diagram of workstation 100 in a work environment (e.g., a home or as a single-unit in an office environment).

Various elements in FIG. 2 have already been shown and described with respect to FIG. 1. For brevity, an explanation of those elements will not be repeated. As such, throughout this disclosure, an explanation of elements described will not be repeated with respect to subsequent Figs.

In addition, to those elements already described FIG. 2, FIG. 2 also depicts a solar panel $202_1$ transmitting DC power; via the DC input connector 108, towards the AC/DC power supply 112; a storage battery 204 transmitting power towards the AC/DC power supply; an optional DC power strip 206; a DC output 208; and an AC output 210.

Illustratively, FIG. 2 depicts a single outside source of DC power and that single source of DC power as solar panel $202_1$. However, as described below with respect to FIG. 3, other sources of DC power can be used or that multiple sources of DC power can simultaneously be used in accordance with the invention.

The AC/DC power supply transmits (i.e., routes) both DC power and AC power; and AC and or DC power to the battery 204 (i.e., to charge the battery when needed). FIG. 2 also shows that the power outlets $120_1$ and $120_2$ receive both AC and DC power. As explained below, the DC power transmitted, via power line 208, is stepped down to a voltage load (e.g., 24 volts or 48 volts). The DC load voltage can be factory set and/or user set.

In addition, task lamps $128_1$ and $128_2$ are depicted as wired to DC line 208. Because the power outlets $120_1$ and $120_2$ and the DC power strip 206 transmit DC voltage a user can use a DC powered device without the need of other circuitry which converts AC to DC.

Figure 3:
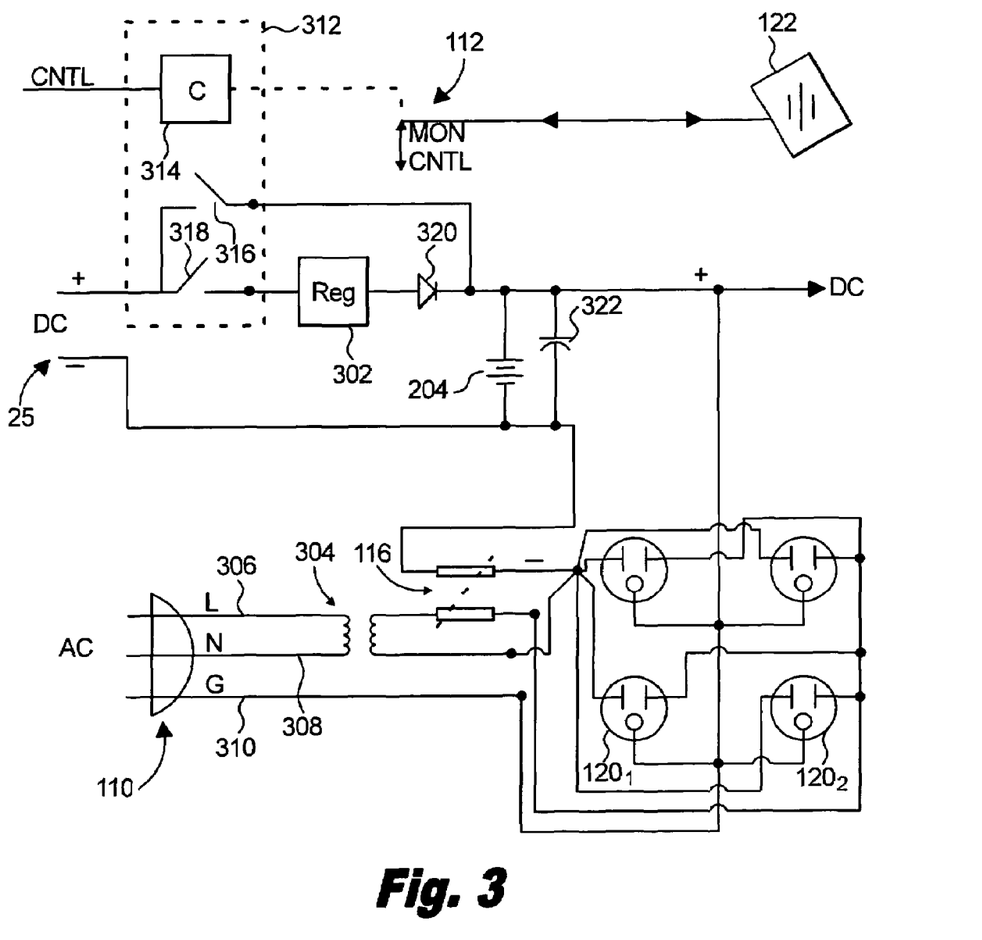
FIG. 3 is a schematic diagram of an embodiment used in accordance with another aspect of the invention.

FIG. 3 is a schematic diagram of another embodiment used in accordance with another aspect of the invention. Specifically, FIG. 3 is a partial schematic of AC/DC power supply 112. FIG. 3 includes AC power received via AC power cord 110. AC power cord 110 includes a line ("L") 306, a neutral ("N") 308, and a ground ("G") 310.

The neutral 308 is DC isolated from ground by a transformer 304. Capacitor 322 allows low loss passage of unbalanced AC current in a 3-wire supply system.

Wiring of AC/DC power outlets $120_1$ and $120_2$ is provided. Circuit breaker 116 is a ganged AC/DC circuit breaker. The DC portion is wired in series with the negative leg of the DC output line to all of the neutral connectors of duplex outlets $120_1$ and $120_2$. The neutral 308, through transformer 304, is also connected to the same connectors.

As also shown in FIG. 3, the ground 310, as well as the positive DC output, are connected to all of the ground connectors of outlets $120_1$ and $120_2$. The line AC input is wired to the line connectors in duplex outlets 8 and 20 through the AC portion of ganged breaker 116.

As further shown in FIG. 3, either an AC or DC overload or short will trip circuit breaker 116 isolating workstation 100 from both AC and DC input. A power plug with a neutral and ground connector will supply DC from a duplex outlet. A power plug with a line and a neutral connector will supply AC to a connected load when plugged into the same outlet.

The circuit within dashed box 312 is not required to practice the invention. However, the circuit 312 can be added in an alternate embodiment to support sharing of resources with other workstations $100_1$-$100_n$. It permits the bi-directional control of DC input 324 via switch elements 316 and 318 under control of network controller 314. Switches 316 and 318 can be transistors, field effect transistors (FET's), isolated gate transistors, or parts of a solid-state or electromagnetic relay. When switch element 318 is on switch element 316 is off and the input direction is selected. When switch element 316 is on switch element 318 is off and the outlet direction of DC is selected.

A voltage regulator 302 outputs constant DC output, (such as for example 24 volts, 48 volts, or other predetermined low voltage level) through blocking diode 320 to the DC loads of the workstation 100. Storage battery 204 is capable of being charged by DC input 324 or by an AC/DC battery charger (not shown). The microprocessor control unit which is part of the AC/DC power supply 112 is also not shown, but it is the intelligence which controls regulator 302 and interfaces with the AC battery charger and with display 122.

In another embodiment, the transformer 304 can be substituted with a blocking capacitor (not shown). The neutral line 308 is DC blocked by the blocking capacitor. The blocking capacitor allows low loss passage of unbalanced AC, in the typical 3-wire supply system. The blocking capacitor also provides a sufficiently low AC impedance to trip the circuit breaker reset switch 116 in the event of an AC short circuit or malfunction while battery 204 (with its very high equivalent capacitance) is disconnected.

Figure 4:
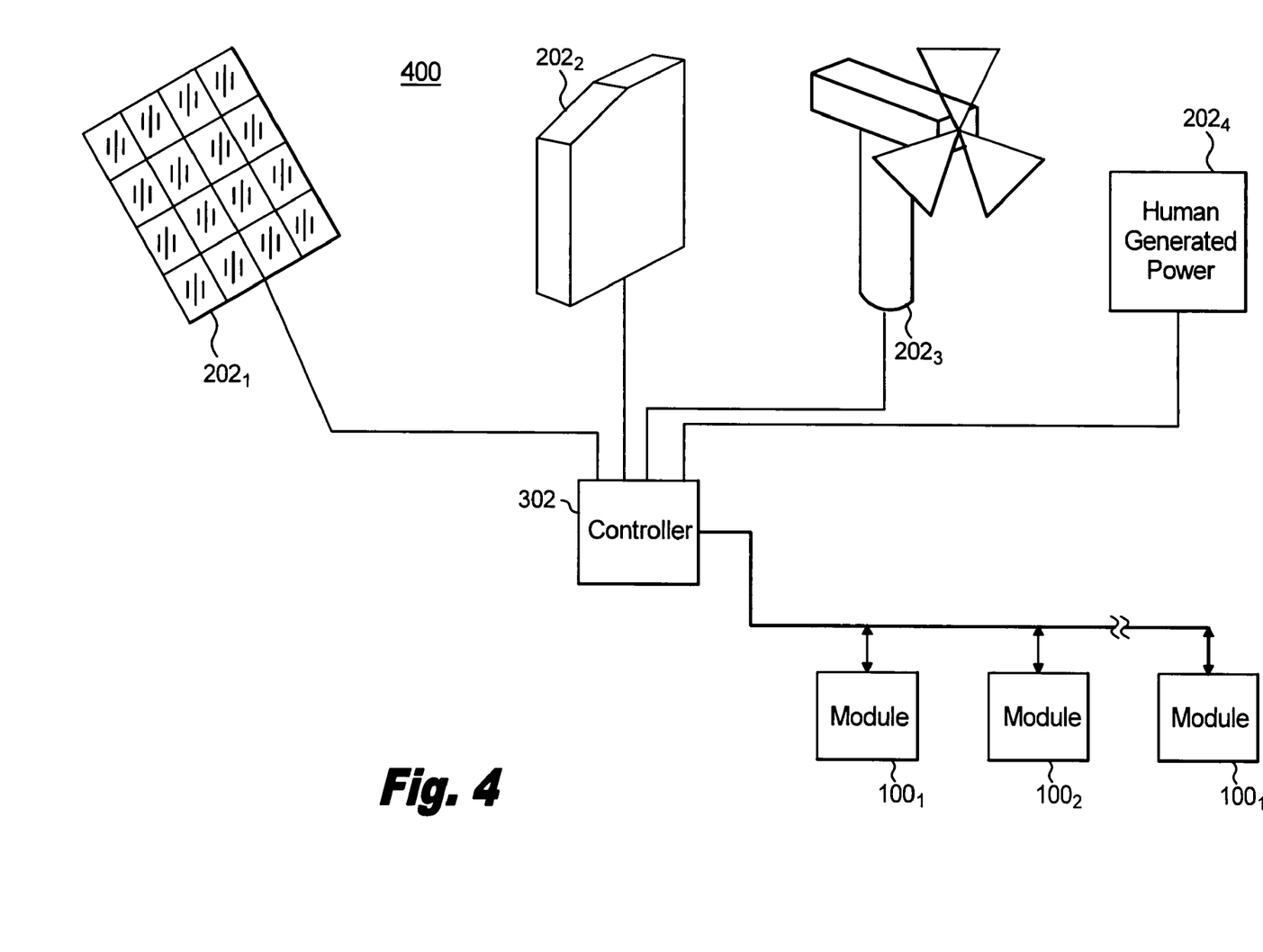
FIG. 4 is an embodiment of a system used in accordance with the invention.

FIG. 4 is a system 400 which uses controller 302 in accordance with an embodiment of the invention. In an optional embodiment for a bussed multi-module system such as shown in FIG. 4, resources can be dynamically shared between workstations $100_1$, $100_2$, $100_3$, ..., $100_n$. In this embodiment, multiple external DC inputs such as solar panel $202_1$, fuel cell $202_2$, wind turbine $202_3$, and/or human generated power $202_4$ can be shared via controller 302 which provides DC voltage to all workstations $100_1$-$100_n$.

Battery storage (not shown) may also be available at controller 302. If workstations $100_1$-$100_n$ do not have individual solar panels or other DC sources attached, the only shared power resource can then be the storage battery. For example, a power-down situation with no AC or DC input (i.e., no or insufficient power from $202_1$, $202_2$, $202_3$, or $202_4$), it is possible to use the storage battery, with sufficient capacity, of an unused workstation $100_1$-$100_n$ to extend the uninterrupted power source ("UPS") use duration of another workstation $100_1$-$100_n$ serving a critical task.

In yet another embodiment of FIG. 4, the workstations $100_1$-$100_n$ can each also have private renewable sources (e.g., solar panel $202_1$). The controller 302 communicates with each AC/DC power supply 112 of the respective workstations $100_1$-$100_n$ to instruct the power supply 112 to route power from a workstation $100_1$-$100_n$ to the power supply 112 of a desired workstation $100_1$-$100_n$. As a result, the controller 302 facilitates sharing amongst the workstations $100_1$-$100_n$ of power stored within the workstations $100_1$-$100_n$.

Figure 5:
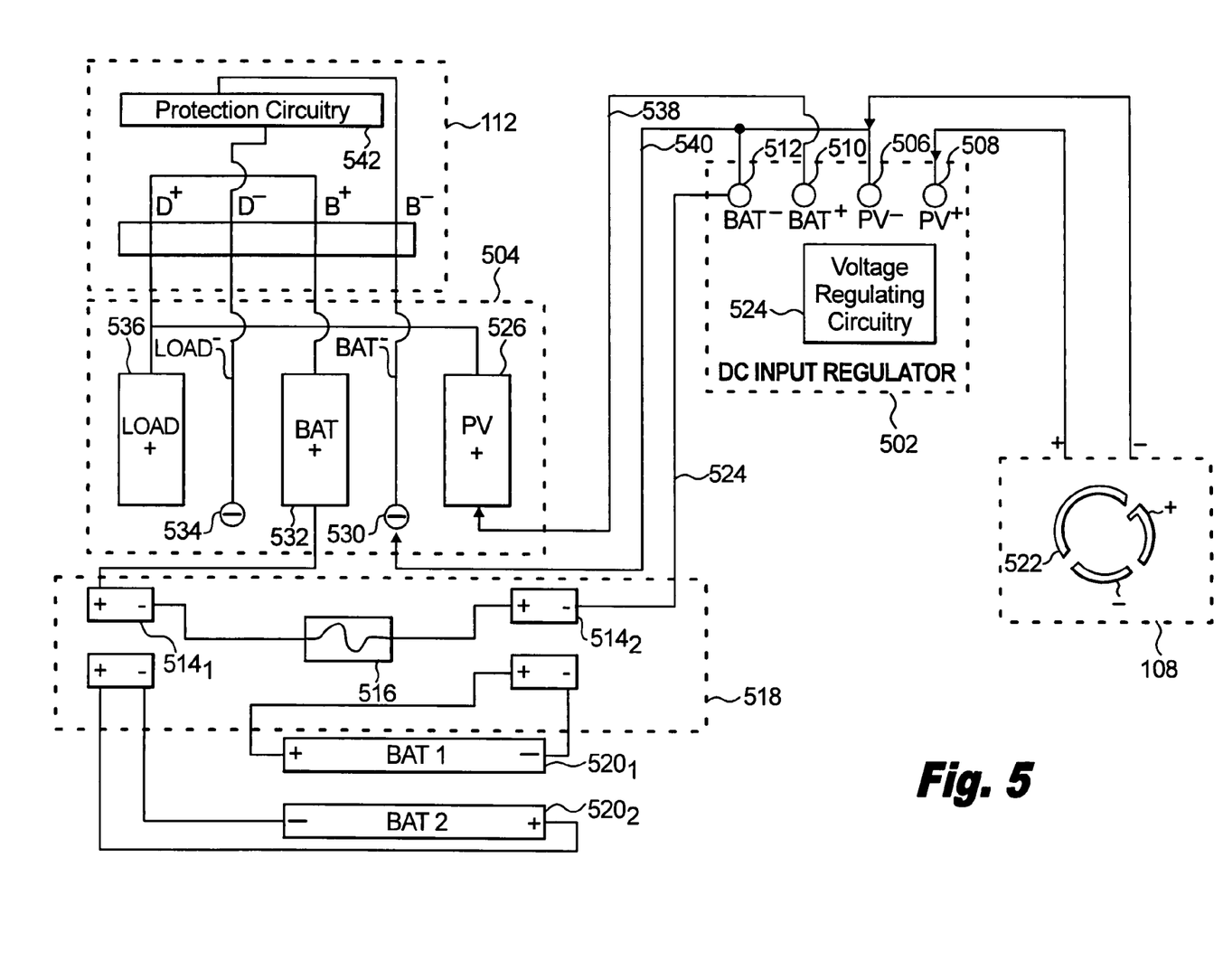
FIG. 5 is a block diagram in accordance with the invention.

FIG. 5 is a block diagram in accordance with the invention. Specifically FIG. 5 is a block diagram 500 of the DC subsystem of the invention. The block diagram 500 includes a DC input regulator 502, an AC/DC power supply 112, a meter control module 504, batteries $520_1$ and $520_2$ (also referred to herein collectively as "batteries 520") battery connections 518, and DC input 108.

DC power from an external power source (not shown, however, the external power can be derived from numerous sources, such as but not limited to, external sources $202_1$, $202_2$, $202_3$, and $202_4$) is received by the DC input regulator 502. Illustratively, a twist type connector 522 is used to couple positive photo voltaic ("PV") 508 and minus photo voltaic 506 terminals, of the DC input regulator 502, to the external DC power source.

In addition, to the positive PV terminal 508 and the negative PV terminal 506, DC input regulator 502 also includes a positive battery terminal 510; a negative battery terminal 512; and voltage regulating circuitry 524. The DC input regulator 502 performs maximum power point tracking by varying the voltage. This tracking helps insure that favorable DC voltage is transmitted from the external DC power source $202_1$-$202_4$. For example, during high solar activity the voltage level transmitted from the external DC power source may be too high. The DC input regulator 502 reduces the amount of voltage received by the rest of the circuitry. In addition, the DC input regulator 502 can also increase the amount of voltage transmitted by the external DC power source $202_1$-$202_4$. For example the chemistry of the solar cell $202_1$ is temperature dependent. The DC input regulator 502 is able to perform the following steps: measure current and voltage to determine power; store the determined power; change the voltage a little and then and measure current and voltage to determine the new power level; and compare the stored power level with the current power level to determine whether there was an increase or a decrease in power. If the DC input regulator 502 decreased the current (which raises the voltage) but the wattage level increased then DC input regulator performs subsequent iterations of the above steps until a peak wattage level is obtained. The DC input regulator 502 reaches a peak wattage level (associated with temperature of the solar panel $202_1$) when it performs the iterative steps and determines that the wattage level has decreased. The DC input regulator 502 then adjusts the voltage level to raise the wattage level back to a peak wattage level. Thus the DC input regulator 502 is constantly performing the iterative steps to adjust the wattage level to a desired peak wattage level. As the temperature of the solar panel changes $202_1$ so does the peak wattage level. In addition, as solar activity intensifies the DC input regulator 502 clips the voltage level to a peak voltage level (e.g., 24 volts or 48 volts) to prevent overcharging of the batteries $520_1$ and $520_2$. The peak voltage level can be factory set in accordance with the batteries $520_1$ and $520_2$ used.

In one mode, the DC input regulator 502 is connected to the batteries $520_1$ and $520_2$ in series for charging of the batteries $520_1$ and $520_2$. The batteries $520_1$ and $520_2$ are connected into the system via connection 518. Connection 518 contains male/female connection pairs $514_1$ and $514_2$ to allow easy installation and removal of batteries $520_1$ and $520_2$. In addition, fuse 516 is provided between the connection pairs $514_1$ and $514_2$ as an additional protection to the batteries $520_1$ and $520_2$.

The AC/DC power supply 112 has a low voltage cut off point to the load. If there is no AC power available and you have a connected load (e.g., a laptop computer) the voltage on the batteries $520_1$ and $520_2$ can droop to about 21 volts because there is not enough DC voltage being supplied by the external DC source $202_1$) at this point the batteries $520_1$ and $520_2$ will shut off. So that batteries $520_1$ and $520_2$ will charge when there is sufficient external DC power (or available AC power) connection 524 is provided so that regardless of the load on the system the batteries $520_1$ and $520_2$ are charging. In another mode, the batteries $520_1$ and $520_2$ are connected to the metering and control module 504 to be measured.

Metering control module 504 contains shunts PV positive 526, battery positive 532, and Load positive 536; and negative terminals 530 and 534. The PV positive shunt 526 and Load positive shunt 536 are electrically coupled. These shunts are used to measure current in the respective branches. The PV positive 526 is electrically coupled to battery positive terminal 510 of the DC input regulator 502 via line 538. The negative (negative battery connection) terminal 530 is connected to the battery negative 512 and PV negative terminal 506 of DC input regulator 502 via line 540. Load positive 536 and negative terminal 534 are connected to outlet receptacle 120. Negative terminals 530 and 534; and the Load positive shunt 536 and the battery positive shunt 532 are coupled to the AC/DC power supply 112.

Inside AC/DC power supply 112, load positive shunt 536 and battery positive shunt are electrically coupled. AC/DC power supply 112 also includes protection circuitry 542. Protection circuitry 542 provides a load disconnect and also a secondary source of short circuit protection for the batteries $520_1$ and $520_2$. Illustratively the protection circuitry can include a Field Effect Transistor ("FET"). The negative terminals 534 and 530 are couple to the protection circuitry 542. The notation $D^+$ and $D^-$ indicate a drain on the AC/DC power supply 112 while the notation $B^+$ and $B^-$ indicate power coming into the AC/DC power supply 112.

Figure 6:
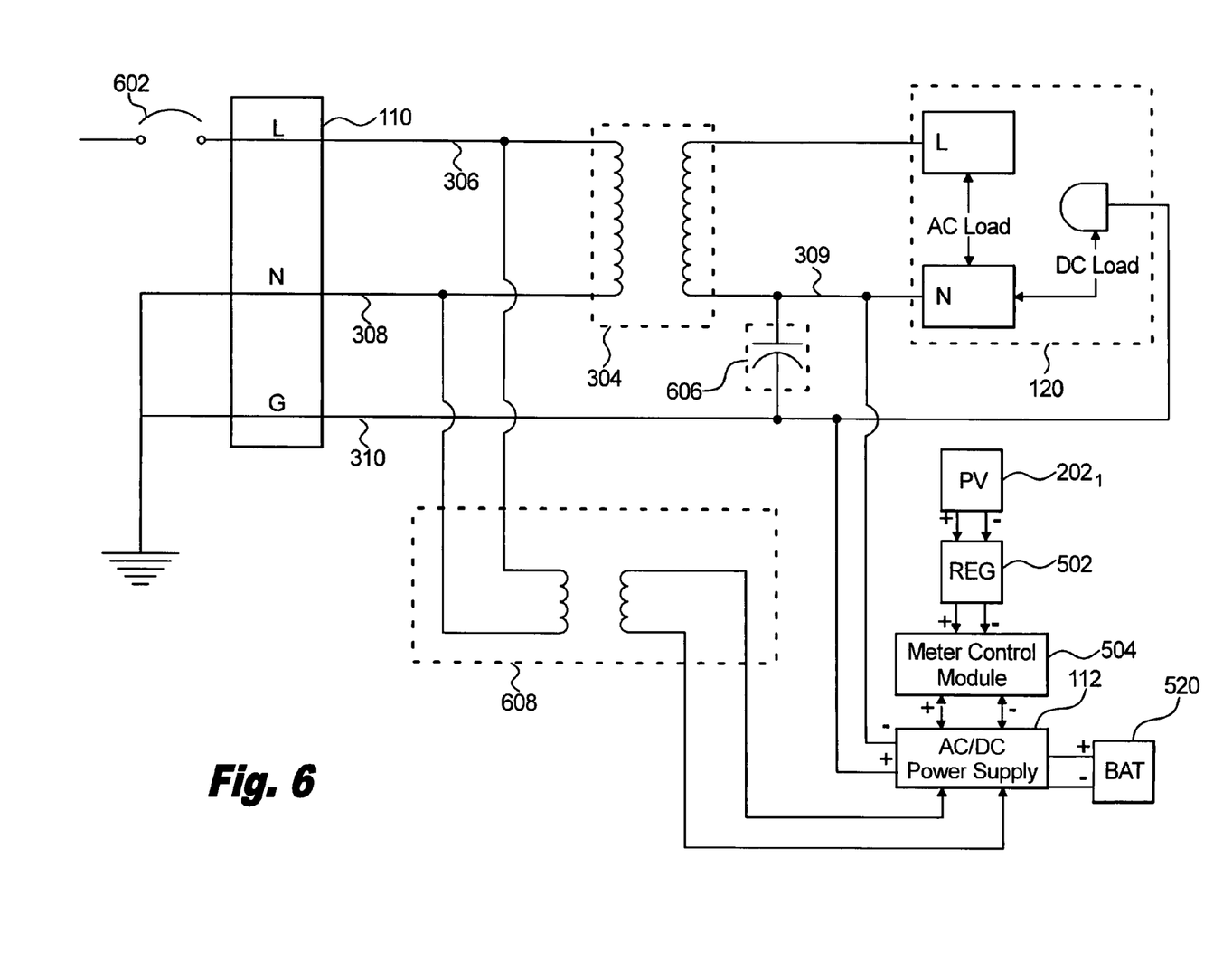
FIG. 6 is still another schematic diagram in accordance with the invention.

FIG. 6 is still another schematic diagram in accordance with the invention. Specifically FIG. 6 is a diagram demonstrating how an outside DC source (illustratively solar panel $202_1$) charges batteries 520 and interacts with the meter control module 504 for the distribution of power.

FIG. 6 includes AC power cord 110, transformer 304, transformer 608, power outlet 120, solar panel $202_1$, DC input regulator 502, meter control module 504, AC/DC power supply 112, and batteries 520. In addition, FIG. 6 includes an optional (i.e., not necessary to practice the invention) grounding capacitor 606 drawn in phantom. The grounding capacitor 606 provides a low impedance path for stray voltage between neutral 309 to ground 310.

AC power cord 110 is connected to the primaries of transformers 608 and 304. The primary winding of transformer 304 is connected line 306 and neutral 308 and provides isolation of the neutral 308 to a load. The primary winding of transformer 608 is connected to line 306 and neutral 308 which provides a step up voltage for operation of the AC/DC power supply 112. The secondary winding of transformer 304 is connected to the line and neutral of power outlet 120. The ground 310 makes a non-broken path from earth ground to the ground of power outlet 120.

Illustratively, transformer 608 steps up the voltage from 120 volts AC to a higher voltage, such as 240 volts AC and transmits the stepped up voltage to the AC/DC power supply 112. The power output by the AC/DC power supply 112 depends on the model of AC/DC power supply 112 (e.g., 24 volts DC). The AC/DC power supply 112 transmits the DC voltage to power outlet 120 via a connection to a positive terminal and a negative terminal to the neutral and the ground respectively of outlet 120. The AC/DC power supply 112 is also coupled to battery 520, and meter control module 504. The meter control module 504 is also coupled to, and receives DC power from, the DC input regulator 502. The DC input regulator 502 receives DC power from an external DC source (e.g., solar panel $202_1$). Solar panel $202_1$, DC input regulator 502, meter control module 504, and battery 520 operate as already described.

Although FIG. 6 depicts a single power outlet 120 it is appreciated that multiple outlets 120*n* can be used. It is appreciated that outlet 120 supply AC using line and neutral of outlet 120 while DC can be independently supplies between neutral and ground of outlet 120.

Figure 7:
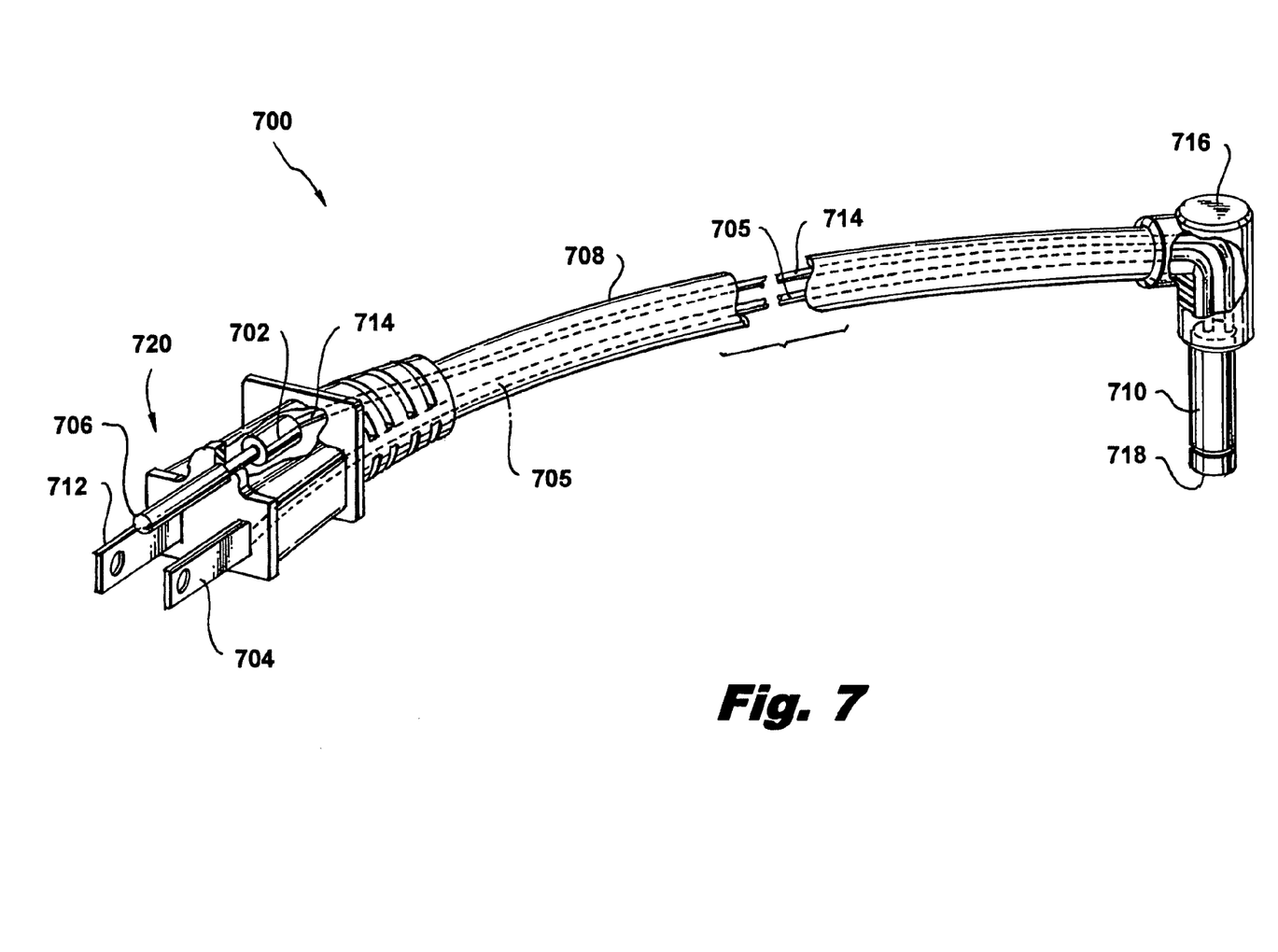
FIG. 7 is a perspective view of another embodiment of the invention.

FIG. 7 is a perspective view of another embodiment of the invention. Specifically, DC to DC whip (or electronic power cord) 700. Because the DC whip 700 is a DC to DC converter the whip 700 does not need other external circuitry associated with converting AC to DC and adjustment of the DC voltage to the appropriate level. For example, in the prior art, when using a laptop computer with an AC power grid the electric adapter contains a brick shaped buck converter somewhere in the extension cord. This power brick buck converter includes circuitry for rectification and stepping down the DC voltage to the appropriate level. These brick shaped buck converters are bulky and typically generate heat.

Returning to FIG. 7, whip 700 includes a male plug 720 with buck converter 702; within an extension cord 708; and a tip 716. The whip 700 receives DC power from a DC power source (e.g., outlet $120_1$) and transmits an appropriate DC level to the tip 710 via the extension cord 708.

The buck converter 702 built into the power plug 720 includes three posts; a low side DC power post 704; a high side DC power post 706; and an unused post 712 (post 712 is nonconductive and only provide stability of the male plug when inserted into an outlet). The low side DC power 704 post is connected to neutral. The high side DC power post 706 is connected to ground. The high side DC power post 706 is input to converter 702. The buck converter 702 output is connected to the distal end of the extension cord 708.

The extension cord 708 contains a plurality of conductive wires. For illustrative purposes, extension cord 708 is depicted as having a negative wire 705 and a positive wire 714.

The tip 716 is connected to the distal end of extension cord 708. The tip 716 includes a positive connection 718 coupled to positive output of 702 via the ground wire 714; and a negative connection 710 connected to the neutral post 704 via negative wire 705. The tip 716 is shaped for insertion into a female receptacle of a device (not shown) so that the whip 700 can transmit DC power to the load device. There are provided multiple whips 700 including different fixed voltages specific to each application. Each separate whip 700 with a respective tip 716 used is selected in accordance within the fixed operating voltage requirements of the device. The buck converter converts and transmits DC voltage at the appropriate fixed voltage level.

It is appreciated that the circuitry described above can be incorporated into various portable devices. For example, although a workstation was used to describe the operation of the invention with respect to FIGS. 1-6, this invention is also applicable with respect to laptop computers. Typical laptop computers contain an internal battery and a receptacle to receive power from an outside source (i.e., through the brick shaped buck converter). When needed the brick shaped buck converter charges the internal battery of the laptop computer. The laptop computer either uses power from the internal battery or external power (i.e., the DC power from the buck shaped buck converter). The circuitry of the present invention can be incorporated internally into a laptop computer so that the laptop computer can simultaneously use the internal battery and power from an external source.

In addition, the DC whip 700 can be used to eliminate the need for the brick shaped buck converter.

Figure 8:
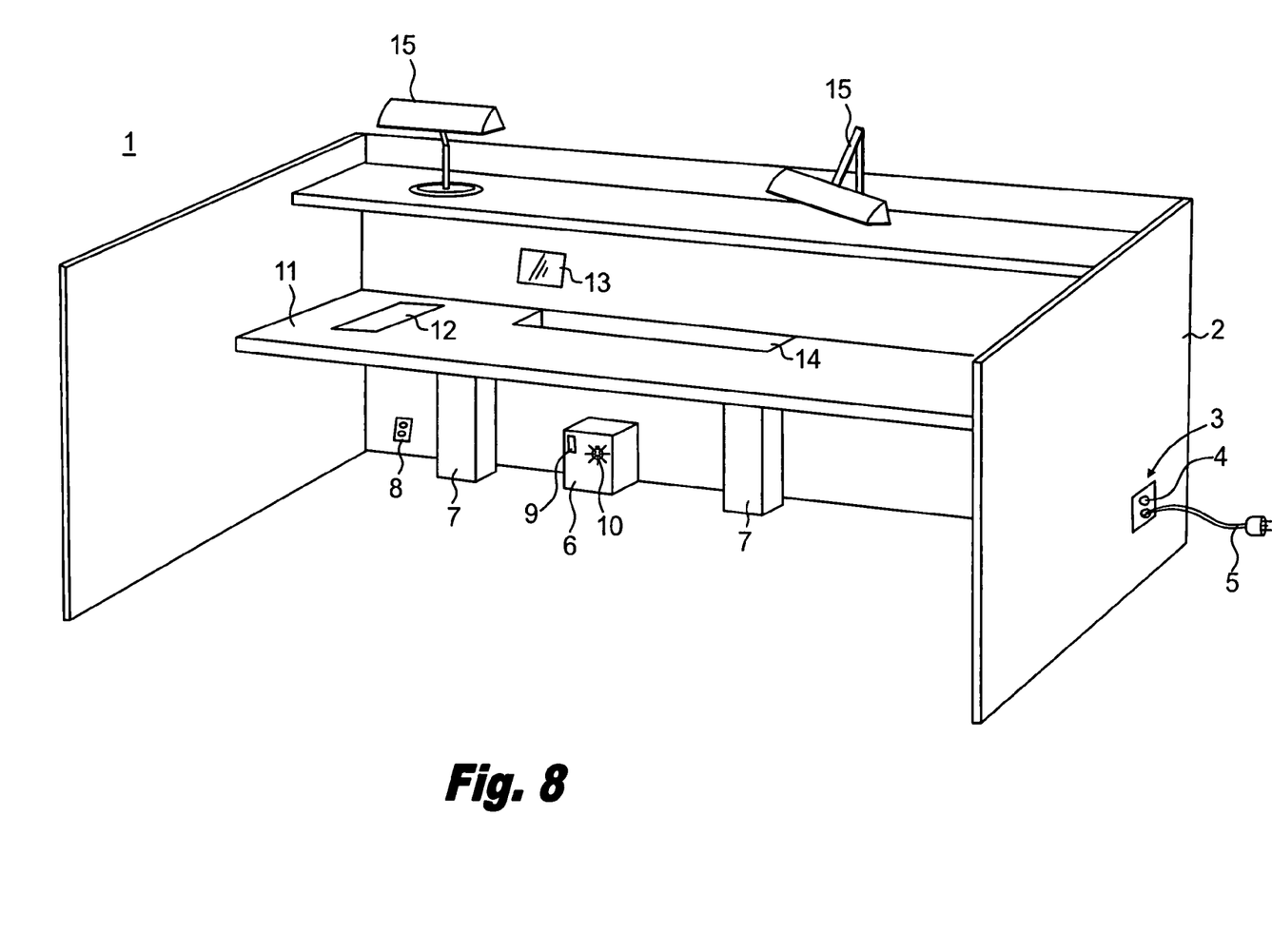
FIG. 8 is a perspective view of the DC hybrid office module of the present invention.

In an alternate embodiment, FIG. 8 shows DC hybrid office module 1 with sides 2, work surface 11, and integrated task lights 15. These lights are DC powered using LED's or DC ballasted fluorescent lamps; they may be adjustable (as shown) or more integrated with module 1. Input receptacle 3 has DC input connector 4 and AC power cord 5. Monitoring and control display 12 (with alternate location 13) is a touch screen for input; it will display renewable energy use, AC usage, battery capacity, and state of storage medium.

FIG. 8 also shows a power router 6 having ganged AC/DC circuit breaker reset switch 9 and "power-on" indicator light 10.

FIG. 8 further shows duplex AC/DC power outlet 8 being one of two that is integrated with office module 1. The other one is within through 14 which also contains DC connectors for DC power modules for cell phones, personal digital assistants (PDA's), etc. Compartments 7 are for storage batteries which will power workstation in the absence of AC or sufficient DC input.

Figure 9:
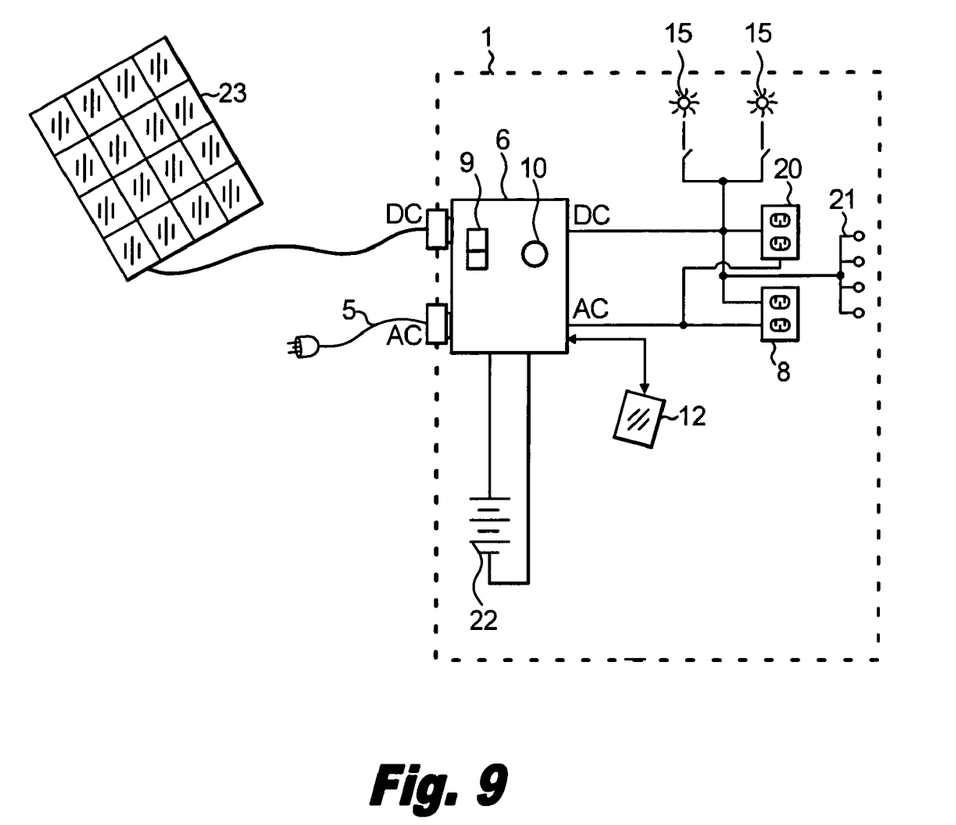
FIG. 9 is a block diagram showing the interconnection of the various components of the office module of the present invention.

FIG. 9 shows the configuration of office module 1 in a home or single-unit office environment. Solar panel 23 is shown as a DC power source, although a fuel cell, wind energy unit, or other DC input could be used. Both the DC output as well as the AC output of power router 6 serve both duplex outlets 8 and 20.

As further shown in FIG. 9, DC is also wired to task lamps 15 through individual switches and to DC-only power strip 21. Monitor panel 12 communicates with power router 6.

Figure 10:
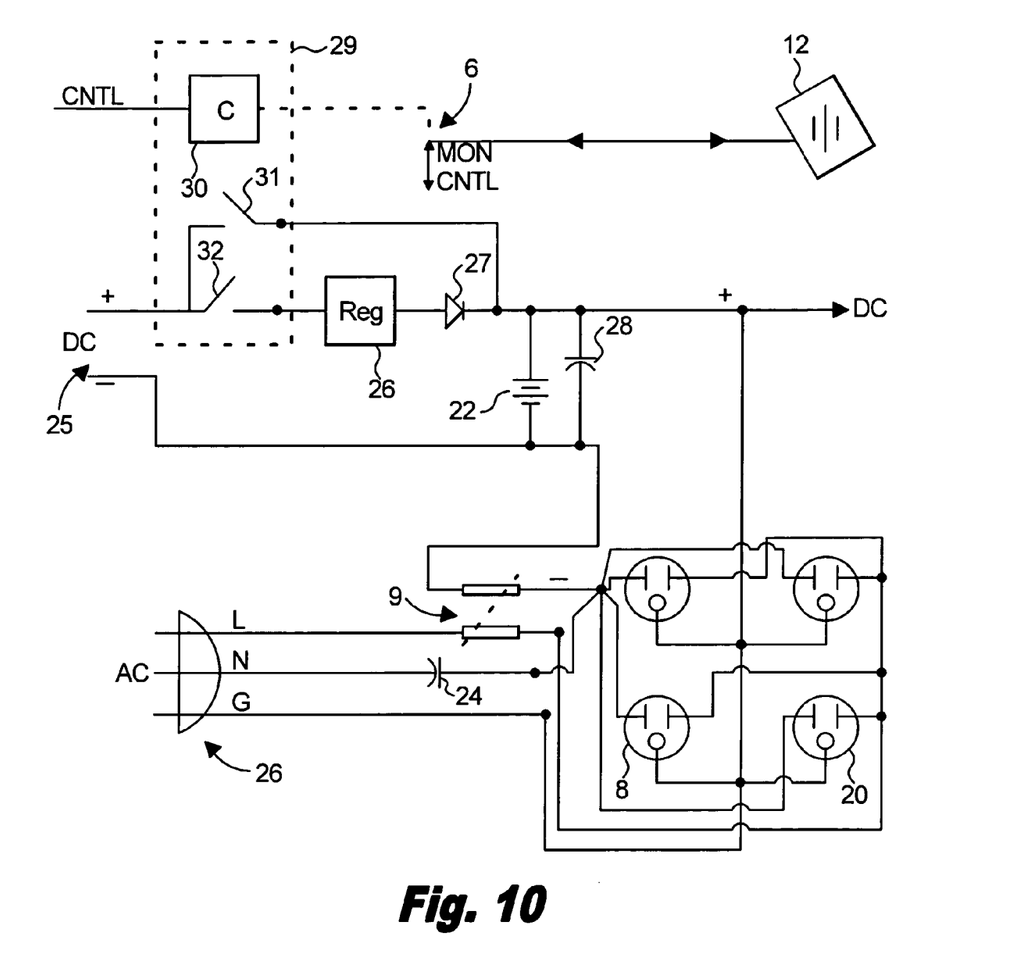
FIG. 10 is a partial schematic diagram of the power router within the DC hybrid office module, wherein wiring of the AC/DC duplex outlets is also shown; and, FIG. 11 is a alternate embodiment of the present invention showing multiple hybrid office modules in a network capable of sharing resources.

The partial schematic of power router 6 is shown in FIG. 10. A voltage regulator 26 outputs constant DC output, such as 24 or 48 volts, through blocking diode 27 to the DC loads of the workstation. Storage battery 22 is capable of being charged by DC input 25 or by an AC/DC battery charger (not shown). The microprocessor control unit which is part of router 6 is also not shown, but it is the intelligence which controls regulator 26 and interfaces with the AC battery charger and with display 12.

FIG. 10 also shows AC input 26 includes line L, neutral N and ground connection G. The neutral is DC blocked by blocking capacitor 24 which is of sufficient size as to allow low loss passage of unbalanced AC in the typical 3-wire supply system. Filter capacitor 28 is sized such that it provides a sufficiently low AC impedance to trip circuit breaker 9 in the event of an AC short circuit or malfunction while battery 22 (with its very high equivalent capacitance) is disconnected. Wiring of AC/DC duplex outlets 8 and 20 is provided. Circuit breaker 9 is a ganged AC/DC circuit breaker. The DC portion is wired in series with the negative leg of the DC output line to all of the neutral connectors of duplex outlets 8 and 20. The neutral AC line through capacitor 24 is also connected to the same connectors.

As also shown in FIG. 10, the AC ground connector, as well as the positive DC output, are connected to all of the ground connectors of outlets 8 and 20. The line AC input is wired to the line connectors in duplex outlets 8 and 20 through the AC portion of ganged breaker 9.

As further shown in FIG. 10, either an AC or DC overload or short will trip breaker 9 isolating office module 1 from both AC and DC input. A power plug with a neutral and ground connector will supply DC from a duplex outlet. A power plug with a line and a neutral connector will supply AC to a connected load when plugged into the same outlet.

The circuit within dashed box 29 is only required in the alternate embodiment to support sharing of resources with other modules. It permits the bi-directional control of DC input 25 via switch elements 31 and 32 under control of network controller 30. Switches 31 and 32 can be transistors, field effect transistors (FET's), isolated gate transistors, or parts of a solid-state or electromagnetic relay. If switch element 32 is on and switch element 31 is off, the input direction is selected. If switch element 31 is on and switch element 32 is off, the outlet direction of DC is selected.

Figure 11:
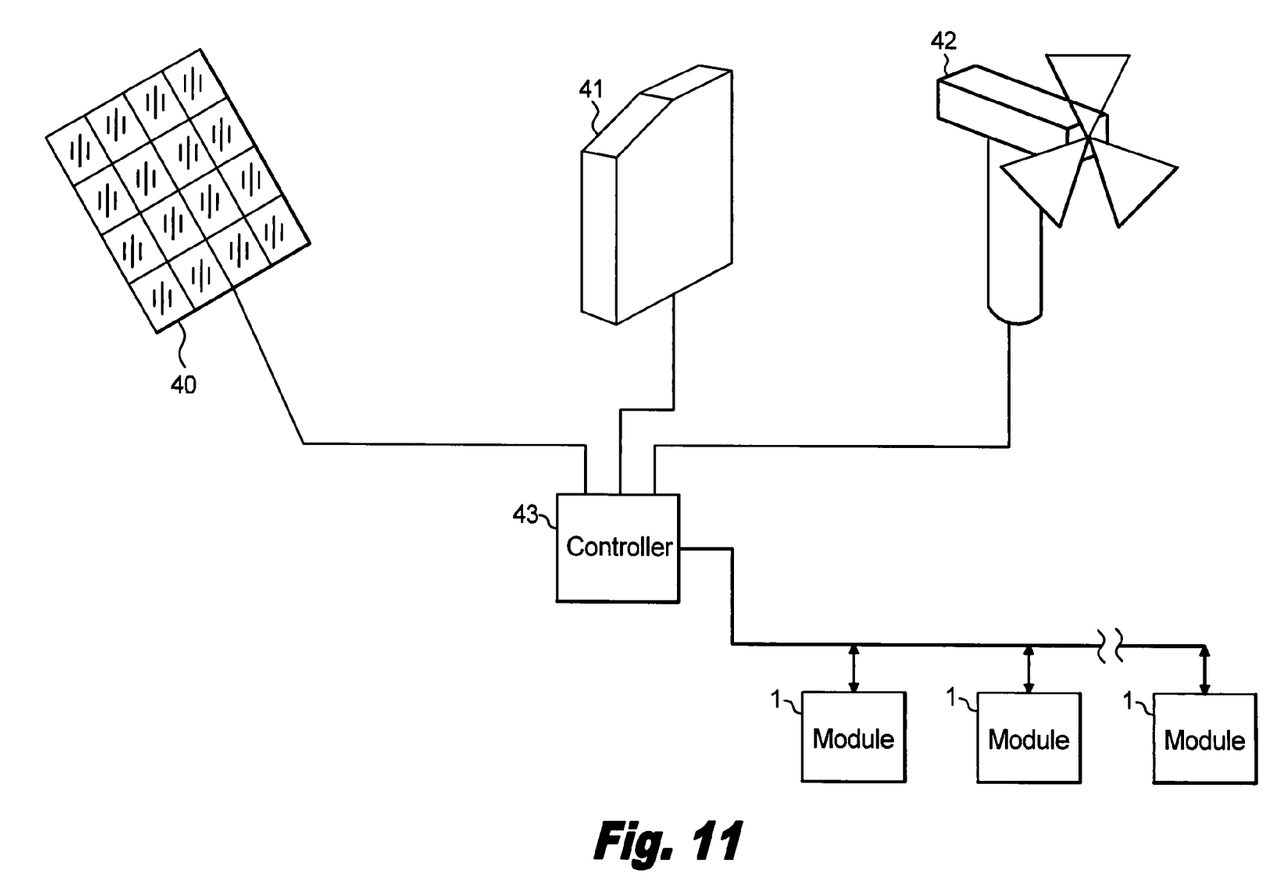

In an optional embodiment for a bussed multi-module system such as shown in FIG. 11, resources can be dynamically shared between modules 1. In this embodiment, multiple DC inputs such as solar panel 40, fuel cell 41 and wind turbine 42 can be shared via controller 43 which provides a constant DC voltage to all modules 1. Battery storage (not shown) may also be available at controller 43. If modules 1 do not have individual solar panels or other DC sources attached, the only shared power resource can then be the storage battery.

For example, as also shown in FIG. 11, a power-down situation with no AC or DC input, it is possible to use the storage battery with sufficient capacity of an unused module 1 to extend the UPS use duration of another module 1 serving a critical task.

The modules of FIG. 11 can also have their own private renewable sources, such as a local solar panel. In this case, these resources can also be shared with other modules 1 in the network. The sharing is under joint control of master controller 43 and power router 6 of an individual module 1.

Further, it is appreciated when used to generate DC power at an output receptacle that an inverter can be used to convert the generated DC power to AC power. For example, for a device/appliance that requires that it be plugged into an AC source.

While the foregoing is directed to embodiments of the present invention, other and further embodiments of the invention may be devised without departing from the basic scope thereof, and the scope thereof is determined by the claims that follow.

The invention claimed is:

1. An electrical power distribution system, comprising:
a) a plurality of workstations, each workstation including
   i) an elevated work surface supported above a floor;
   ii) a power input receptacle having DC and AC inputs spaced apart on the power input receptacle;
   iii) a power output receptacle having DC and AC outputs spaced apart on the power output receptacle;
   iv) a local energy storage device for storing DC power at the respective workstation; and
   v) a router connected to the local energy storage device and having a switching assembly and a local controller for switching the switching assembly between a pair of switched states; and
b) a master controller for sharing DC power among all the workstations, the master controller having a plurality of inputs connected to a plurality of external DC sources external to the workstations, and a control output connected to the local controller at each workstation, the master controller being operative for controlling each local controller to conduct DC power from any of the external DC sources to any one of the local energy storage devices in one of the switched states of a respective switching assembly connected to the one local energy storage device, and to conduct stored DC power away from any one of the local energy storage devices in a respective workstation to all other workstations needing DC power in the other of the switched states of the respective switching assembly connected to the one local energy storage device.

2. The system of claim 1, wherein the DC input of each power input receptacle is connected to the external DC sources that include a solar panel, a fuel cell, a wind turbine, an energy storage device and a human-generated power generator; and wherein the AC input of each power input receptacle is connected to an external AC source that is an AC mains line.

3. The system of claim 1, wherein the DC input of each power input receptacle is a connector mounted on each workstation, and wherein the AC input of each power input receptacle is a power cord extending away from each workstation.

4. The system of claim 1, and a ganged circuit breaker at each workstation, for interrupting the delivery of at least one of the DC power and AC power in one of an overload and a short condition.

5. The system of claim 1, and a voltage regulator at each workstation, for regulating voltage of the DC power delivered to a DC load.

6. The system of claim 1, and a touch screen at each workstation, for enabling user input of data, and for displaying information.

7. The system of claim 6, wherein the screen displays the information as a report of usage of the DC power and AC power.

8. The system of claim 1, and an electronic power cord having one end region connected to the DC output at each workstation, and an opposite end region connected to a DC load at each workstation; and a converter between the end regions of the power cord, for converting the DC power to a voltage rated for the DC load.

9. The system of claim 1, wherein the control output is a bus line, and wherein the local controller at each workstation is connected in parallel across the bus line.

* * * * *